United States Patent [19]
Squires

[11] 3,981,355
[45] Sept. 21, 1976

[54] SOLID-GAS HEAT EXCHANGE METHOD IN COUNTERCURRENT CONTACTING OF GAS AND GRANULAR MATERIAL IN PANEL BED

[76] Inventor: Arthur M. Squires, 245 W. 104 St., New York, N.Y. 10025

[22] Filed: Sept. 19, 1974

[21] Appl. No.: 507,398

[52] U.S. Cl. ................................ 165/2; 55/80; 55/96; 55/267; 165/107; 165/119
[51] Int. Cl.² ................................ F25B 13/00
[58] Field of Search ............... 55/96, 302, 80, 98, 55/267, 474, 479, 512–519; 34/168, 174; 22/277 C; 165/107, 119

[56] References Cited
UNITED STATES PATENTS

| | | | |
|---|---|---|---|
| 2,601,102 | 6/1952 | Dickey | 165/107 |
| 3,296,775 | 1/1967 | Squires | 55/96 |
| 3,800,508 | 4/1974 | Zenz | 55/479 |

FOREIGN PATENTS OR APPLICATIONS

| | | |
|---|---|---|
| 216,675 | 6/1924 | United Kingdom |

*Primary Examiner*—Bernard Nozick
*Attorney, Agent, or Firm*—Abraham A. Saffitz

[57] ABSTRACT

Methods are provided for countercurrent heat exchange between gas and a solid granular material arranged in an improved panel bed. The methods afford outstandingly low pressure drop in the gas, and especially short residence times of gas in the panel bed during its heating or cooling. The methods are useful at extreme temperatures, such as temperatures beyond 2000°F. They are useful for heating air for process use against products of combustion of a fuel; for heating air for combustion of low-grade fuels and wastes of low heating value against their products of combustion; for heating a feed gas to a process against a gaseous or vapor effluent therefrom; and for removing particulate matter from the gas being heated or cooled, as, for instance, when the gas is an effluent from a fluidized bed of particulate solids. The methods are useful for storing heat or cold in a granular material where a hot or cold gas is available at a time inconvenient for utilizing the heat or cold in the gas; the methods are then advantageously employed to liberate the stored heat or cold to a gas when it is needed.

15 Claims, 7 Drawing Figures

SOLID-GAS HEAT EXCHANGE METHOD IN COUNTERCURRENT CONTACTING OF GAS AND GRANULAR MATERIAL IN PANEL BED

CROSS-REFERENCE TO RELATED APPLICATIONS

This application is related to my co-pending applications, filed on Aug. 28, 1974, numbered and entitled as follows:

1. Treating Gas and Granular Material in Panel Bed, Ser. No. 501,276
2. Filtering Dusty Gas in Panel Bed, Ser. No. 501,278
3. Countercurrent Contacting of Gas and Granular Material in Panel Bed, Ser. No. 501,277
4. Treating Gas and Fine Granular Material in Panel Bed, Ser. No. 501,275

The instant application is also related to my co-pending applications, filed simultaneously herewith, numbered and entitled as follows:

5. Electrostatic Filtration in Panel Bed Ser. No. 507,387
6. Precoating Panel Bed for Filtering Aerosol of Micron-Size Particulates Ser. No. 507,403
7. Treating Gas with Chemically Reactive Dust in Panel Bed Ser. No. 507,387
8. Treating Gas with Catalytic Dust in Panel Bed Ser. No. 507,386
10. Treating Gas and Wetted Granular Material in Panel Bed Ser. No. 507,377
11. Treating Liquid and Granular Material in Panel Bed Ser. No. 507,376

The instant application is the ninth of this sequence. In its apparatus features, the instant application is closely related to the above-listed application number (3).

FIELD OF THE INVENTION

This invention relates to the intimate contacting of a gas and a granular solid material in a countercurrent manner for the purpose of exchanging heat between gas and solid.

In its various aspects, it relates to heating air by heat exchange with a granular material that has been heated by combustion products; to heating air where the combustion products are provided by combustion of a fuel with the air; to heating a gas feed to a process by heat exchange with a granular material that has been heated by a gaseous or vapor effluent of the process, such as, for example, cracking of a hydrocarbonaceous fuel or thermal decomposition of a metal carbonate; to the storage of heat and cold; to the storage of heat of compression of air to be stored in an underground cavern for recovery at a later time and then to be reheated by the stored heat and further heated by combustion and expanded in an expansion turbine to provide work; to the exchange of heat between gaseous product and effluent of a cryogenic process; and to heating of an inert gas for melting or conditioning a metallic or non-metallic material coordinately with steps for supplying the inert gas.

In another of its aspects, it relates to removing particulate matter from gas to be heated or cooled, and especially in the case of gaseous effluent from a gas-fluidized bed.

DESCRIPTION OF THE PRIOR ART

My aforementioned co-pending application number (1), "Treating Gas and Granular Material in Panel Bed", furnishes a review of prior art relating to panel beds, wth emphasis upon art relating to techniques for removing spent granular material, together with filtered dust if any is present, from fluid entry surfaces of such panels. I incorporate this review in the instant application by reference.

My earlier U.S. Pat. No. 3,296,775 (Jan. 10, 1967) taught a reverse surge flow of gas across a panel bed to produce a movement of the granular material in a mass toward the outer edges of louvers supporting gas entry faces, effecting a spill of the material from each face, and removing filter cake if present. The surge flow was to peak sharply to a flow substantially above the minimum steady flow rate at which a steady reverse flow of gas just causes motion of the granular material, and thereafter was to decline substantially immediately.

My aforementioned co-pending application number (1), "Treating Gas and Granular Material in Panel Bed", provides a more particular characterization of a reverse transient flow of gas (i.e, puffback) to produce a movement of granular material in mass (a "body movement") toward the gas entry faces of a panel bed.

My aforementioned co-pending application number (2), "Filtering Dusty Gas in Improved Panel Bed", provides an improved chevron louver for support of gas entry faces of a panel bed, with the advantage that filtered dust penetrating the bed is not dragged downward in the general motion of solid in the panel bed that follows puffback cleaning.

My aforementioned co-pending application number (3), "Countercurrent Contacting of Gas and Granular Material in Panel Bed", provides an improved gently curved louver that promotes countercurrenticity of contacting between gas and solid treated in a panel bed. This application reviews prior proposals for ways to achieve countercurrenticity in panel bed devices, and I incorporate this review in the instant application by reference.

Despite much effort to develop a gravitating-bed device for heating a gas through contact in countercurrent flow with a downwardly moving bed of pebbles, the pebble bed heater has not found much continued use by industry. Disadvantages are a relatively high pressure drop, low gas-treating capacity, and expense for providing make-up of the special pebbles of relatively large size (usually beyond one-quarter inch) and mechanically tough constitution that are required, there being a big loss due to attrition of the pebbles if they are conveyed pneumatically from the bottom to the top of the pebble bed heater. The attrition loss is connected to the size of the pebbles, for it is known that a large part of the attrition occurring in a gravitating-bed device served by an air lift to return solid to the top of the device is associated with the free fall of solid particles at the top of the air lift pipe onto the top of the gravitating bed. Larger particles fall at higher velocities in free fall and suffer more frequent fractures and more rapid size degradation than do small particles. A further disadvantage of the large particles used in a pebble bed heater of the art is the fact that they do not readily lend themselves to the fluidized-bed standpipe technique for maintaining a pressure seal between two operating zones. In general, the pebble bed of the art has used the gravitating-bed seal leg technique, that requires far greater height as well as careful control of the content in the particle mass of the fine particles that result from the aforementioned attrition.

GENERAL DESCRIPTION OF THE INVENTION

The countercurrent gas-solid contacting zones of a panel bed with gently curved louvers of a special design provide many opportunities for heat transfer between a gas and a solid in equipment of outstandingly small size and low pressure drop and having the capability of using heat-carrying particles of far smaller size than those used in pebble bed heaters of the art. The particles need not be specially fabricated to resist attrition, ordinary quartz sand often being satisfactory or cheap grades of crushed refractory solids being suitable for use at high temperature. The particles ordinarily lend themselves to use of the fluidized-bed standpipe technique for maintaining a pressure seal.

OBJECTS OF THE INVENTION

An object of the invention is to provide an improved method for transferring heat between a granular solid material and a gas.

Another object is to provide a gas-solid heat transfer method of outstandingly high capacity and low pressure drop.

Another object is to provide a gas-solid heat transfer method suitable for use at temperature beyond those conveniently reached by indirect tubular heat exchangers using metal tubes.

Another ojbect is to provide a heat transfer method for rapidly reducing the temperature of a gas to preserve temperature sensitive matter therein.

Another object is to provide a heat transfer method for rapidly reducing the temperature of a gas while providing a further method for usefully recapturing the heat in the gas.

Another object is to provide a method of recovering and storing heat or cold in a gas.

Another object is to provide a heat transfer method for raising the temperature of air to a high level.

Another object is to provide a heat transfer method for recovering heat from the gaseous or vapor effluent of a process conducted at high temperature and passing the recovered heat to a gaseous feed to the process.

Another object is to recover heat of compression of air to be stored in a cavern and to store the heat and to give the heat back to the air as it is withdrawn from the cavern for use in a power-generating device.

Another object is to exchange heat between gaseous products and feeds of a cryogenic process.

Another object is to provide a heat transfer method useful for supplying a gas at high temperature for heating a solid for its treating or conditioning or melting or sintering wherein the gas is chemically inert toward the solid and wherein the heat transfer method is coordinately useful in steps for generating the gas.

Another object is to provide a heat transfer method aiding the combustion of a waste solid fuel or a waste liquor containing fuel values, either being of low heating value and difficult to burn in air at ordinary temperature.

SUMMARY OF THE METHOD FEATURES OF THE INVENTION

My invention relates to an improved method of countercurrently contacting gas and granular material with each other to effect heat exchange between them. Granular material at a given temperature is arranged in a bed having a plurality of transversely disposed, upwardly spaced, gas entry portions separated by interposed supporting members having outer and inner edges. The gas entry portions have gas entry faces having outer edges that are substantially contiguous with the outer edges of the supporting members. A typical supporting member is gently curved and inclines downwardly and inwardly from its outer edge and then upwardly and inwardly toward its inner edge. The inner edge of a typical supporting member is either above the inner edge of the superjacent free surface of granular material, borne by the aforementioned typical member, or when below, a line drawn through these edges is inclined at an angle of less than about 45° to the horizontal. The bed has gas exit portions spaced horizontally apart from the inner edges of the supporting members. Gas at a different temperature is caused to flow forwardly in a substantially continuing flow during the aforementioned contacting through the gas entry portions of the granular material bed and outwardly from the gas exit portions to effect an exchange of heat between said gas and granular material. Thereafter, a transient flow of gas is caused to move in the direction in reverse to the aforementioned flow of gas. The transient reverse flow produces first a rise (at a given rate of rise) and subsequently a fall in the pressure difference between the gas exit portions and the gas entry portions. This difference should remain greater than a first critical minimum difference for a time interval less than about 150 milliseconds, this first critical minimum difference being that difference at which a steady flow of gas in the aforementioned reverse direction just produces a localized spill of granular material from the gas entry faces. The pressure difference produced by the transient reverse flow should peak to a top value beyond a second critical minimum difference, which is the pressure difference at which a transient flow of gas in the reverse direction, producing the second critical minimum difference at the aforementioned given rate of rise, just initiates a body movement of the granular material toward the gas entry faces to remove a portion of the granular material from the bed. The second critical minimum difference depends upon the rate of rise in the pressure difference, being larger the more rapid the rise. The aforementioned time interval is advantageously held within about 50 milliseconds if the invention is also used to filter dust from a gas.

For convenience of reference, I use the term puffback for the specified reverse transient flow of gas and the term puffback cleaning or puffback renewal to denote the operation whereby granular material is spilled from the gas entry portions of the panel bed and the bed thereby cleaned and renewed.

The method is useful for heating air to a high temperature by heat exchange of the air with a hot granular material. This material after the heat exchange would advantageously be reheated by heat exchange according to the method with hot combustion products of combustion of a fuel with air. The heated air could advantageously be supplied to a combustion in a furnace for operation at extrordinarily high temperature, such as a furnace to supply hot gas to a magnetohydrodynamic device for generating electricity, or a furnace melting or sintering or heat treating a refractory metallic or nonmetallic material, or a blast furnace reducing a metal ore with coke. In this application of the method, air could be supplied at high temperature at far lower pressure loss and in equipment of far smaller size than can be supplied by the conventional air-heating stoves of the iron blast furnace, for example.

The method is useful for heating air to be used in combustion of a low-grade fuel, such as municipal solid waste or the solid wastes of many important industries, such as the wood pulp and papermaking industry, or waste liquors containing fuel values, such as the waste liquors from this same industry as well as many other waste liquors, such as liquors from the treatment of petroleum fractions with sulfuric acid, or waste gas streams containing fuel species. Such fuels often have higher heating values below 5,000 British Thermal Units (Btu) per pound, and are difficult to burn unless the air is provided at a high temperature. Granular solid employed for heating the air may advantageously be heated by the method of the invention by heat exchange with offgases from the combustion of the waste fuel material. This combustion is often advantageously conducted in a fluidized bed, with the advantage that the method of the invention may be used to remove particulate matter from the effluent from the fluidized bed. Often it is advantageous to use the same granular solid material in the combustion fluidized bed as that used in the panel bed gas-solid heat exchange device of the invention.

The method of the invention may be used for heating a solid by heat exchange with a gas and for thereafter storing the solid to store the heat for later use. It sometimes occurs that a hot gas stream is being supplied at a time when it is not convenient to use the heat in the gas. In such cases, the heat may be recovered by heat exchange to a cold granular solid, the hot solid may be stored, and the heat may be recovered from the solid for use at a later more convenient time. An important example of this practice arises in the case of the proposal to store compressed air in the ground against a requirement for peakload electricity generation. The air would be compressed and stored in a deep cavern during the night, for example, with use of offpeak shaft power having a relatively low economic value. The air would be withdrawn from the cavern during the day and would be heated by combustion with a fuel and expanded through an expansion turbine to provide electricity when the demand for electricity is large. Hot compressed air from an air compressor operating in the night could be cooled by the new heat-exchange method against cold granular solid, the heated solid could be stored, and the air could be reheated in the daytime by the new method against the hot solid withdrawn from storage, which would then be stored cold for re-use during the night. The net effect of the procedure would be a saving of fuel.

The method of the invention may also be used for cooling a solid by heat exchange with a cold gas and for thereafter storing the solid to store the cold for later use. For example, withdrawal of gaseous methane from a liquid store of this gas is intermittent and variable in rate. Cold in the methane could be stored in a granular solid for steady use in a steadily operating cryogenic process, such as the liquefaction and rectification of air.

The method of the invention may also be used for cooling a feed gas to a cryogenic process, such as air supplied to an air-separation installation, by heat exchange against a cold solid, that would subsequent to this heat exchange be used by the new method to heat the cold gaseous products, such as nitrogen and oxygen from air separation, to substantially atmospheric temperature.

A large number of industrial procedures are advantageously conducted at extreme temperatures and often require large inputs of heat at such temperatures, or greatly benefit from such inputs. Heat inputs are difficult at temperatures beyond those readily provided by an indirect heat exchange device of the tubular type using metal tubes, especially if the hot gases readily available for such heat exchange contain dust, and most especially if the dust is sticky. Some of the procedures depend upon a rapid quenching of the temperature of gases in order to preserve a sensitive material whose yield would fall rapidly if the residence time of the process gases were to extend beyond desirable limits. Some of the procedures require special atmospheres, as for example, an inert atmosphere that will not oxidize a metal or react with carbon. Expensive indirectly-fired radiant furnaces are sometimes provided, with expensive radiating structures made of refractory nonmetallic or metallic materials, in these latter procedures. Many examples of industrial procedures can be given that will benefit from use of the new method to cool a gaseous or vapor effluent from the procedure by heat exchange with a heated granular material that is subsequently cooled by heat exchange by the method with at least one gaseous or vapor feed to the procedure. I give below a list of representative examples of such procedures, wherein the benefits of the new method and the effluent and feed streams that are candidate for cooling and heating respectively by the new method will be evident to those skilled in the art without further elaboration herein:

i. Gasification of a fuel with air to yield a fuel gas.
ii. Gasification of a fuel with air and steam to yield a fuel gas.
iii. Gasification of a fuel with oxygen and steam to yield a fuel gas.
iv. Gasification of a fuel with steam to yield a fuel gas.
v. Thermal or catalytic cracking or hydrocracking of a hydrocarbon to yield hydrocarbons of lower molecular weight.
vi. Carbonization or hydrocarbonization of a bituminous coal or subbituminous coal or lignite in presence of a feed gas to yield fuel gas or vapor.
vii. A process as in (vi) with the fuel gas or vapor remaining at the temperature of the carbonization or hydrocarbonization for a time less than about 10 seconds and benefitting from the short residence time of the fuel gas or vapor that the heat-exchange method of the invention can provide for cooling the fuel gas or vapor.
viii. A process as in (vi) with the fuel gas or vapor remaining at the temperature of the carbonization or hydrocarbonization for a time not more than a few tenths of a second and benefitting from the aforementioned short residence time during cooling of the fuel gas or vapor.
ix. Thermal cracking of a hydrocarbon fuel to yield valuable hydrocarbons of lower molecular weight with the hydrocarbons remaining at the temperature of the thermal cracking for a time not more than a few tenths of a second and benefiting from the aforementioned short residence time during cooling of the hydrocarbons.
x. Thermal decomposition of a metal carbonate such as calcium carbonate in presence of the products of combustion of a fuel with air to yield offgas containing carbon dioxide evolved from the carbonate.

xi. Thermal decomposition of a metal hydroxide such as aluminum hydroxide in presence of the products of combustion of a fuel with air to yield offgas containing water vapor evolved from the hydroxide.

xii. Production of cement from cement raw materials clay, calcium carbonate, and iron oxide in presence of the products of combustion of a fuel with air to yield offgas containing gaseous species evolved from the cement raw materials.

xiii. Graphitization of a coke or chair or charcoal in presence of a feed gas supplied at a high temperature and removed from the coke or char or charcoal at a lower temperature containing gaseous fuel species evolved from the carbon and with combustion of the fuel species with air.

xiv. Reduction of a metal oxide such as iron oxide by a reducing gas such as hydrogen or carbon monoxide to yield as gas containing gaseous oxides such as water vapor or carbon dioxide.

xv. Reduction of a metal oxide such as iron oxide by air and carbon to yield a gas containing oxides of carbon.

xvi. Melting a metal for its purification or for adding an alloying constituent or for adjusting the concentration of an alloying constituent in presence of the products of combustion of a fuel wth air or in presence of a feed gas supplied at a high temperature and removed from the metal at a lower temperature and raised in temperature by admixing products of combustion of a fuel with air.

xvii. Heat treating or conditioning a metal in presence of the products of combustion of a fuel with air or in presence of a feed gas supplied at high temperature and removed from the metal at a lower temperature and raised in temperature by admixing products of combustion of a fuel.

xviii. Melting or sintering a refractory metal oxide or a mixture of refractory metal oxides in presence of the products of combustion of a fuel with air or in presence of a feed gas supplied at a high temperature and removed from the oxide or mixture of oxides at a lower temperature and raised in temperature by admixing products of combustion of a fuel with air.

xix. Melting silica with other metal oxides to yield a glass in presence of the products of combustion of a fuel with air.

Many of the processes yield offgases containing dusts or fumes whose removal is desirable or imperative, and the method of the invention may advantageously be used also to remove such particulate matter.

By the method of the invention, (vii) through (ix) will benefit from substantially complete recovery of the high-level, valuable heat in the hot gases or vapors to be quenched and brought down in temperature quickly, something that is not possible by rapid gas-cooling methods previously known to the art.

Processes (xiii), (xvi), (xvii), and (xviii) sometimes benefit greatly if the aforementioned feed gas is chemically inert toward the coke or char or charcoal in (xiii), toward the metal in (xvi) and (xvii), or toward the metal oxide or oxides in (xviii). Often, a gas consisting primarily of nitrogen is advantageous, and such a gas can be provided conveniently and coordinately with the method of the invention by using as a fuel in a combustion with air to provide combustion products for admixing with the gas at lower temperature after it has been removed from coke or char or charcoal, metal, or metal oxide or oxides. Thereafter the gas would be cooled to condense substantially all water vapor, and the water would be removed as a liquid to provide a gas consisting primarily of nitrogen for reheating by the method of the invention and for use as the aforementioned feed gas to the process (xiii), (xvi), (xvii), or (xviii).

Many processes conducted in fluidized beds, especially processes (i) through (xiv) of the foregoing list, are advantageously served by the new method for heating feed gas to a fluidized bed against a hot solid that has been heated by heat exchange according to the new method against gaseous effluent from the bed. A disadvantage of conventional fluidized-bed art is that heat recovery is difficult and heat economy is often poor, and the new method overcomes this disadvantage, while also providing a method for removing particulate matter present in fluidized-bed offgas.

DESCRIPTION OF THE PREFERRED EMBODIMENTS

Figure 1:
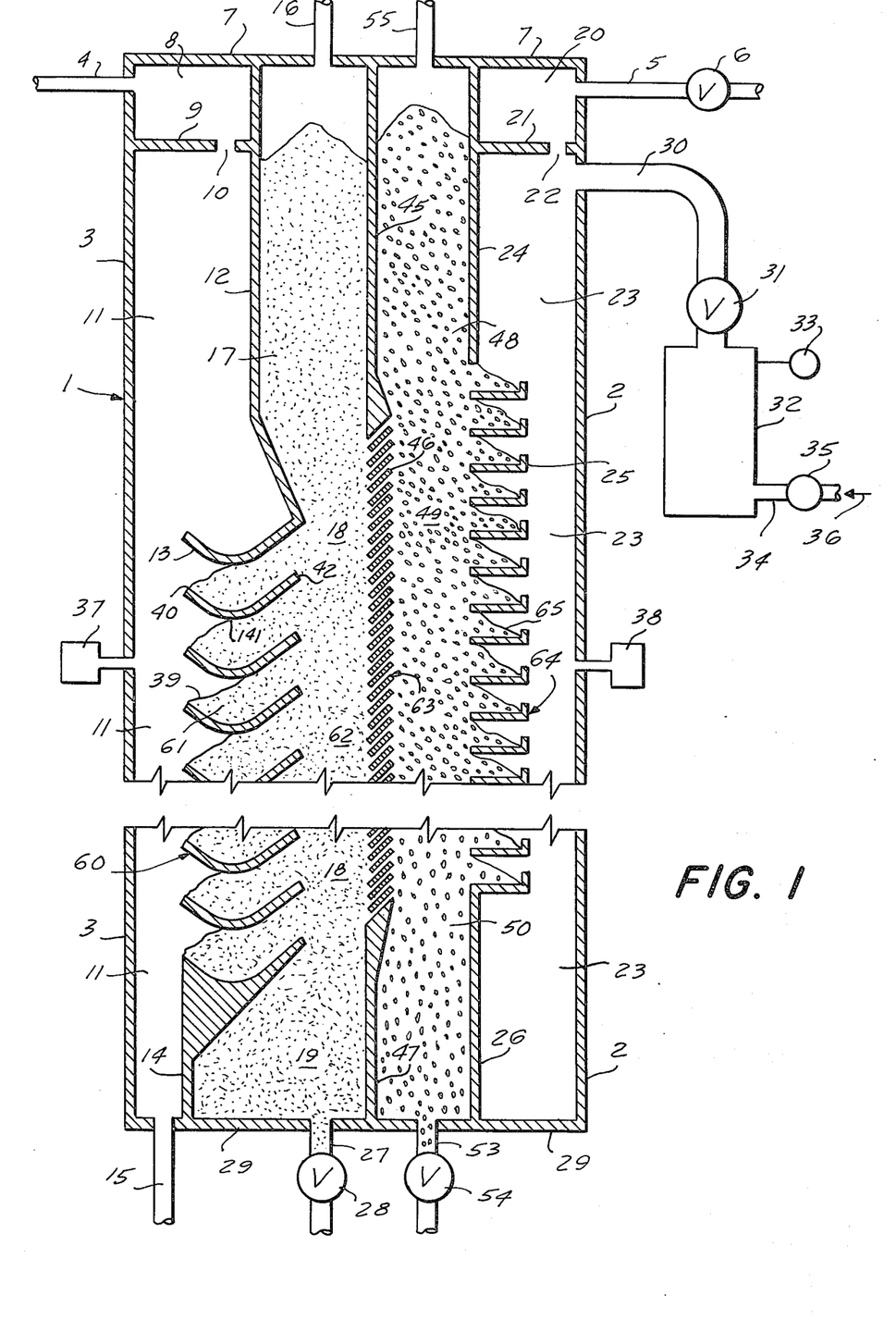
FIG. 1 is a vertical section view of a preferred panel bed gas-solid contactor for countercurrent heat exchange between gas and solid, with a bed of contacting solid.
Figure 2:
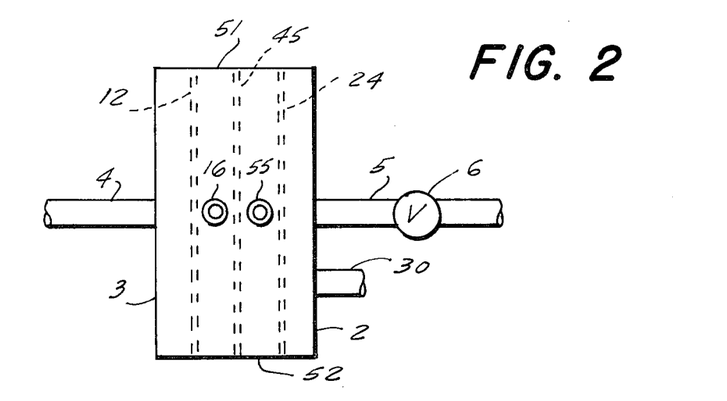
FIG. 2 is a top view of the panel bed of FIG. 1.

In the several figures, like reference numerals refer to like parts having like functions. In FIG. 1 the panel bed gas-solid contactor 1 comprises a casing of rectangular cross-section having opposed side walls 2 and 3 and top plate 7 and bottom plate 29. Opposed edge walls 51 and 52 are to be seen in FIG. 2, a top view. A generally vertical bed of granular contact solid 18 is within the casing and retained by vertically extending, horizontally spaced-apart, perforate walls 60 and 63. Granular material is supplied by gravity feed to bed 18 from supply bed 17, retained between imperforate walls 12 and 45. Additional granular material may be added to bed 17 from pipe 16. Granular bed 18 may be drained, if desired, via space 19 between walls 14 and 47, normally filled with static granular solid, by means of pipe 27 and valve 28. Perforate wall 63 comprises a series of inclined louvers or slats 46 mounted one above another in a structure resembling a venetian blind and narrowly spaced apart in the vertical direction. Horizontally spaced-apart from wall 63 is perforate wall 64 comprising a series of generally horizontal louvers or slats 25 also mounted one above another. Granular material bed 49, comprising material considerably coarser in size than the granular contact solid of bed 18, and also preferably denser than the contact solid, is retained by perforate walls 63 and 64, and is supplied from supply bed 48, retained between imperforate walls 45 and 24. Additional granular material of the coarser character may be added to bed 48 from pipe 55. Granular bed 49 may be drained, if desired, via space 50 between walls 47 and 26, normally filled with static granular material, by means of pipe 53 and valve 54. Walls 12, 60, 14, 3, 51, and 52, bottom 29, and partition 9 enclose gas entry compartment 11, to which gas to be filtered is supplied from pipe 4 via plenum space 8 and slot 10 in partition 9 (the slot 10 preferably extending from wall 51 to wall 52). Walls 24, 64, 26, 2, 51, and 52, bottom 29, and partition 21 enclose gas exit compartment 23, from which gas leaves via slot 22 in partition 21 (the slot 22 preferably running from wall 51 to wall 52) and via plenum space 20 and pipe 5. Louvers 25 cooperate to support gas exit surfaces 65 of bed 49.

Perforate wall 60 comprises a series of members 13. A member 13 typically inclines outwardly and downwardly from its inner edge 42 and then upwardly and into inlet compartment 11 toward its outer edge 40. The curvature of member 13 should be gentle, that is to say, there should be no sharp corners and no pockets or protuberances to interfere with the body movement of gas entry portions 61 of bed 18. The perforations of wall 60 are to be considered as being formed between respective inner edges 42 of adjacent members 13. The members 13 are mounted in a manner such that they cooperate to support gas entry portions 61, viz., a line drawn through edge 40 of a given member 13 at an angle of about 25° from the horizontal and upwardly toward the next superjacent member 13 should innersect the superjacent member, so that gas entry surface 39 borne by the given member 13 will display an inner edge 141 in contact with the superjacent member. It will be seen that the gas entry portions 61 are transversely disposed, upwardly spaced, and separated by the interposed supporting members 13, the gas entry faces 39 being substantially contiguous with outer edges 40. A line drawn through innner edge 141 of a given gas entry face 39 and the inner edge 42 of its supporting member 13 should be inclined at an angle less than about 45° from the horizontal, if the inner support member edge 42 is below inner gas entry surface edge 141, as is the case in FIG. 1. Alternatively, edge 42 may lie above edge 141. The aforementioned co-pending application number (3), "Countercurrent Contacting of Gas and Granular Material in Panel Bed", shows and discusses a number of illustrative alternative designs of supporting member 13 and of panel bed 1, including a design fabricated mainly of ceramic material and especially suited for use at high temperature, and I incorporate these alternative designs and the discussion thereof in the instant application by reference.

Gas exit portions of bed 18 are seen at 62 in FIG. 1, and are spaced from edges 43.

Pipe 30 connects gas exit compartment 23 with tank 32, quick-opening valve 31 being provided to isolate tank 32 from space 23. Tank 32 is connected to source 36 of gas under pressure via line 34 and valve 35. Pressure gauge 33 is provided to help adjust the pressure of gas in tank 32.

In operation of panel bed contactor 1 for countercurrent heat exchange between gas and a granular material, the panel bed 1 is initially charged with granular contact solid at a given temperature from line 16, filling spaces 19, 18, and 17 as shown in FIG. 1. Spaces 48, 49, and 50 are filled with a second, coarser granular material. A gas at a different temperature is then caused to flow forwardly into panel bed 1 from pipe 4, for example, a hot gas to be cooled by a colder granular medium, as illustrated schematically in FIG. 3. The gas is caused to flow forwardly through panel bed 1 by opening valve 6 in pipe 5. If the gas is not supplied at a sufficient pressure to cause the gas to flow readily through panel bed 1, optional blower 72 is conveniently provided to carry gas from pipe 5 to line 73 for conducting gas from the system after its cooling by heat exchange with the granular medium in panel bed 1. Periodically, tank 32 is filled with gas at pressure from supply 36, valve 35 is closed, valve 6 is closed to interrupt the flow of gas being cooled, and valve 31 is opened quickly to produce the specified transient reverse flow from compartment 23 to compartment 11. Pipe 15 is provided to withdraw solid removal from bed 18 by the puffback renewal. The frequency of puffback renewal is preferably regulated so that the withdrawn solid is essentially at the temperature of the hot gas supplied from line 4, i.e., so that it essentially lacks further virtue for cooling the gas, and accordingly is spent from the viewpoint of the heat exchange. The frequency of puffback renewal is also best regulated so that solid in bed 18 between edges 42 and perforate wal 63 substantially does not participate in the heat exchange, i.e., the locus of the heat exchange should remain entirely within gas entry portions 61 of bed 18, lying between edges 40 and 141 and the vertical plane defined by edges 42.

Figure 3:
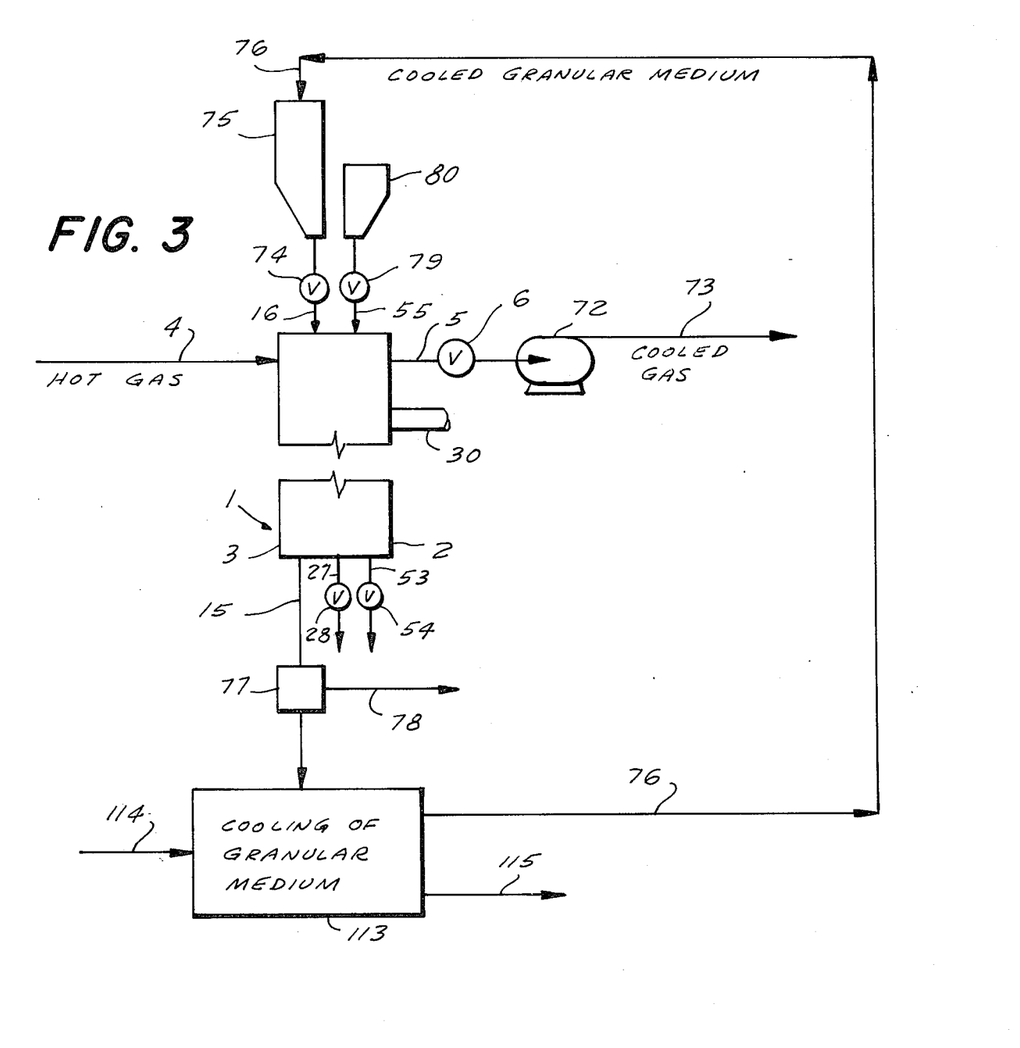
FIG. 3 is a schematic diagram illustrating use of the invention to cool a hot gas by heat exchange against a cold granular medium.

As seen in FIG. 3, pipe 15 sometimes advantageously conducts the spilled solids to means 113 for cooling the solids, for example, by heating a cold fluid supplied to 113 from line 114 to provide a hot fluid via line 115. Pipe 76 is conveniently provided for return of the cooled contact solid to supply hopper 75, from which the solid may be returned to panel bed 1 via valve 74 and pipe 16. Supply hopper 80 may conveniently be provided to hold the aforementioned second, coarser granular material in readiness for supply to spaces 48, 59, and 50 via valve 79 and pipe 55. After passage of the specified transient reverse flow and after waiting a few seconds for falling solid matter to settle to the bottom of compartment 11, valve 31 is closed, and valve 6 is opened to resume treatment of the gas by the freshly cleaned and renewed bed 18.

Transducers 37 and 38, seen in FIG. 1, are conveniently provided in a test to determine the aforementioned first and second critical minimum pressure differences between space 23 and space 11, although competent fluid dynamicists will be able to calculate instantaneous pressure difference verses time in a test of puffback, given the porosity of beds 18 and 49, the size of valve 31, the speed of its opening, the size of tank 32, the pressure therein, the length and the diameter of line 30, and the dimensions of compartment 23. Tests for determining the critical pressure differences and illustrating the suitable limits on the time interval during which the puffback maintains the reverse pressure difference above the first critical minimum difference are discussed more fully in the aforementioned co-pending application number (1), "Treating Gas and Granular Material in Panel Bed", together with representative data, and this discussion is incorporated herein by reference. In brief, a time interval of about 150 milliseconds represents an approximate upper limit for acceptable performance, beyond which spills from individual gas entry surfaces 39 are badly distributed, there being far more spill from surfaces near the top of a panel like that seen in FIG. 1 than from surfaces near the bottom, and beyond which spills also partake disadvantageously more of the character of a localized spill and less of the character of the preferred body movement. A practical minimum time interval for operation of the arrangement of FIG. 1 appears to be about 3 to 5 milliseconds, given the practical requirement that space 23 must be large enough to accommodate a flow of gas leaving wall 64. It should be noted, however, that one might, for example, achieve an extremely short time interval by mounting a large number of blank cartridges on wall 2 and by firing them simultaneously to discharge gas explosively into space 23; or one might provide an arrangement whereby wall 2 might be displaced almost instantaneously toward wall 64 and then returned to its normal operating position.

Immediately after the puffback, the granular material of bed 18 moves downward to make good losses of material from the body movement of material into the gas entry portions of the bed and spilled from the gas entry faces 39.

Means 113 of FIG. 3 may sometimes aadvantageously comprise a second panel bed gas-solid contactor like panel bed 1 if cold fluid from line 114 is a gas. In such a case, the arrangement of FIG. 3 amounts to a way of transferring heat from the hot gas of pipe 4 to the cold gas of line 114 with the granular solid acting as a heat carrier. In this version, the arrangement has wide utility, including several examples to be discussed hereinafter, and including the transfer of heat by means of a solid heat carrier from the feed gas or gases to a cryogenic process to cold gaseous products of the process.

If the hot gas in pipe 4 carries dust, it will be removed by filtration on gas entry faces 39 of granular bed 18, which in this case advantageously comprises material smaller than about 20 mesh (U.S. Standard) in size. The dust will appear with the spilled granular material in pipe 15, and means 77 are advantageously provided for separating dust from the granular material and discharging the dust via line 78.

The panel bed gas-solid contactor of the instant invention affords countercurrent gas-solid heat exchange equipment of outstandingly small size and at outstandingly small gas pressure loss (typically below 20 centimeters of water). Gas velocities in the horizontal direction across bed 18 in excess of 30 feet per minute are preferred, and overall gas-treating capacities of more than 600 cubic feet per minute per square foot of ground area occupied by the panel bed device are readily provided. Where rapid cooling of a gas is required, as for the preservation of a heat-sensitive product of a chemical process conducted at high temperature, a cooling time of the order of 0.1 to 0.2 second can easily by provided (by providing a horizontal gas velocity of 100 feet per second, say, and a heat-exchange zone 1 to 2 inches across in the horizontal direction). The panel bed heat exchanger also has the advantage of being capable of treating a gas with a contact solid of outstandingly small size. Gravitating beds of the type ordinarily used in the art for countercurrent gas-solid heat exchange commonly use particles larger than ½ inch in size and often use particles larger than 1 inch. I prefer to use a granular contact solid smaller than about 10 mesh, and frequently it is advantageous to use a solid smaller than about 20 mesh or even a solid smaller than about 40 mesh. Generally speaking, I prefer a contact solid larger than about 100 mesh. The smaller contact solid sizes have the advantage that there is less loss of solid because of the production of fines due to attrition when such smaller solids are handled and moved about in conventional systems for conveying solids pneumatically.

An application in which a larger contact solid is sometimes preferable is use of the heat exchange method of the invention to heat a solid containing hydrocarbonaceous fuel values recoverable by subjecting the solid to an elevated temperature. For example, a large stockpile of oil shale pellets is accumulating in Sweden as a byproduct of an operation to recover uranium values from the oil shale rock of that country. The pellets are about ⅛ inch in diameter, of a substantially uniform size, and would lend themselves well to an operation in which they are heated very quickly by the method of the invention through passage of a hot gas into the panel bed of the invention fitted for countercurrent contacting. The gas could advantageously be steam or hydrogen or, sometimes preferably, a combustion product gas derived from burning a coke residue from the pellets after a hydrocarbon oil has been distilled from the pellets. The burning of the coke residue might also be conducted in the panel bed of the invention, and several panel beds could be provided for heating up feed gases to the operation and for cooling products, with the pellets or other solid heat carrier passing the heat from hotter fluids to cooler ones. Other oil shale rocks and tar sands and substances containing hydrocarbonaceous fuel values, including some coaly materials such as subbituminous coal and lignite and other coals that do not soften and cake when heated, might be processed in this manner, although the Swedish pellets are an especial opportunity since they are available in a good size for use in panel bed 1 without costs for crushing or other particle-size preparation steps. As those skilled in the art will appreciate, the quick heating possible by the heat exchange method of the invention will tend to improve the quality, amount, and economic value of the hydrocarbon oil products obtained from an operation of this type by comparision with retorting procedures in which solid heat-up time is slow.

Figure 4:
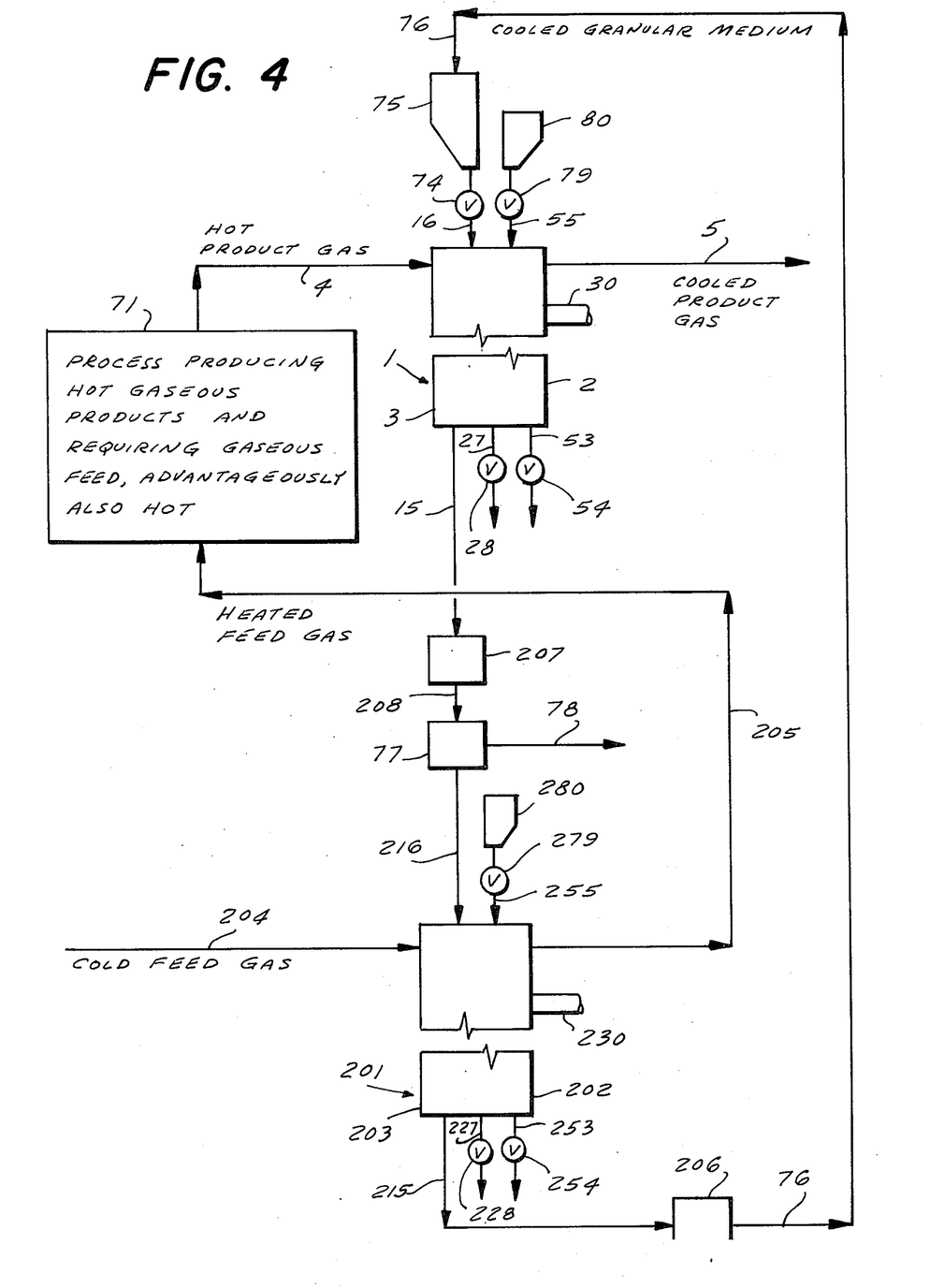
FIG. 4 is a schematic diagram illustrating use of the invention to heat the feed gas to a process producing hot gaseous products and requiring gaseous feed that is advantageously also hot and to cool the hot gaseous products.

In FIG. 4, panel bed 1 cools the hot product gas of a process 71, that requires a gaseous feed, advantageously also hot. Heated granular solid contact material removed from panel bed 1 by puffback renewal is passed via pipe 15 through optional means 207 for increasing the pressure of the gas associated with the granular material and sometimes also replacing this gas by a different gas, and through optional means 77 for separating the material from dust if the hot product gas in pipe 4 was dusty, to pipe 216 for feeding to second panel bed 201. Means 207 may comprise, for example, a fluidized standpipe of the granular material, or sometimes preferably a rotating lock or other lock chamber device known to the art. Equipment items 202, 203, 204, 205, 215, 227, 228, 230, 253, 254, 279, and 280 serve the same respective functions, already described in connection with panel bed 1, as equipment items 2, 3, 4, 5, 15, 27, 28, 30, 53, 54, 55, 79, and 80. Cold feed gas is supplied to panel bed 201 from pipe 204, and after heating, the gas is carried to process 71 by pipe 205. Pipe 215 conveys cooled granular medium spilled from panel bed 201 by puffback renewal to gas lift 206 for vertically conveying the medium via line 76 to hopper 75, which preferably is situated at the highest elevation of the overall arrangement.

Process 71 is advantageously any one of the aforementioned processes (i) through (xix). Sometimes part of the cooled product gas provides at least a part of the cold feed gas in a gas recycle arrangement, often advantageously after condensation of water vapor from the cooled product gas and removal of liquid water. By this arrangement, the feed gas may comprise substantially nitrogen if process 71 includes a step for burning hydrogen with air, often preferably after the hot nitrogen from line 205 has given up part of its heat to a substance inert chemically to the nitrogen.

The arrangement of FIG. 4 is especially advantageous if process 71 is a fluidized bed, and especially a fluidized bed in which a poor fuel, of higher heating value less than about 5,000 Btu per cubic foot, is burned with air. Such poor fuels may arise, for example, as a waste gas or waste liquor or waste solid from an industrial operation.

Figure 5:
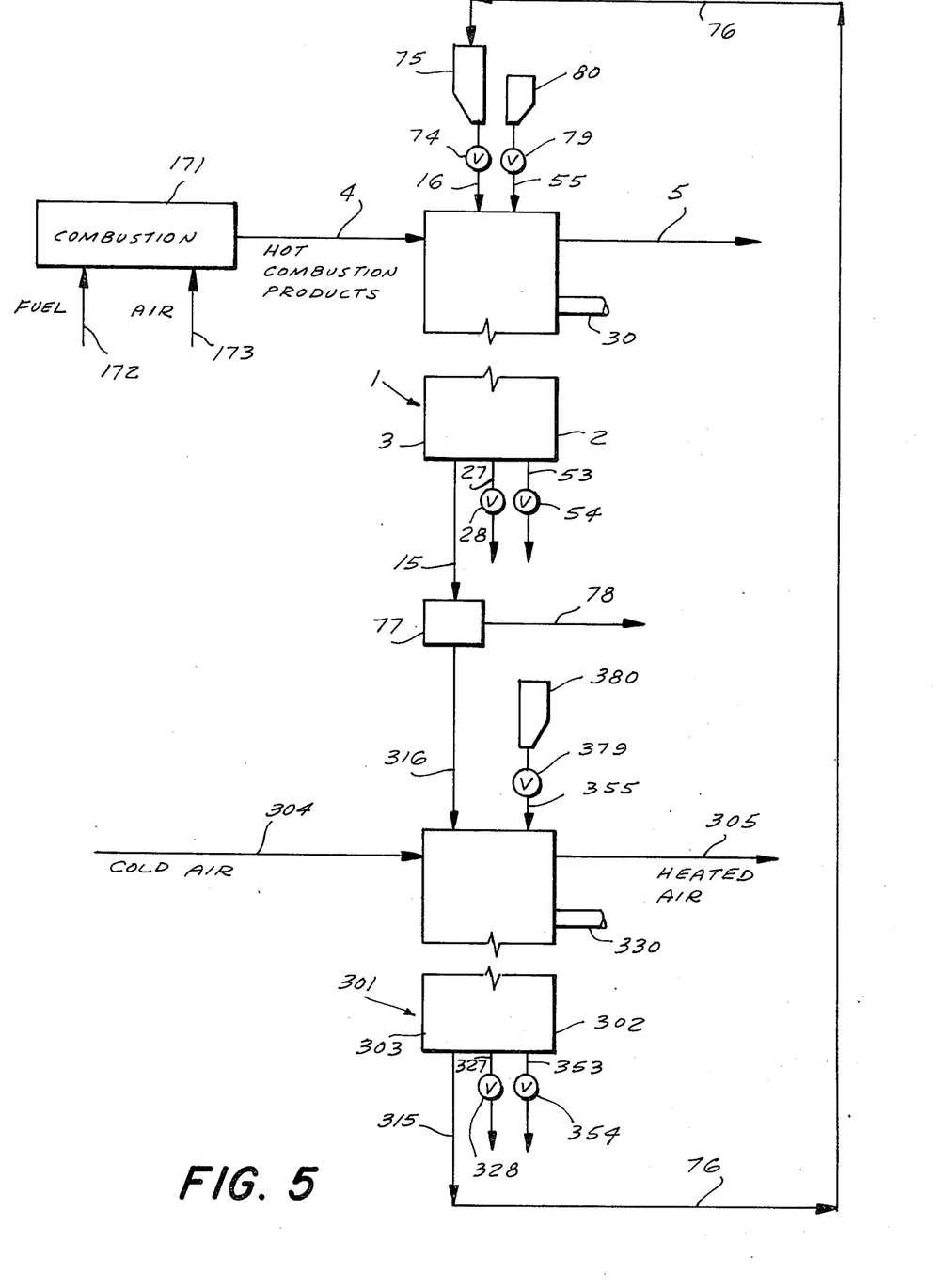
FIG. 5 is a schematic diagram illustrating use of the invention to heat air.

FIG. 5 shows schematically how hot products of combustion of a fuel with air can be used with a heat carrier to provide air at high temperature, for example to an iron blast furnace or other industrial operation requiring air at high temperature. Combustion 171, supplied with fuel and air from lines 172 and 173 respectively, supply hot combustion products to line 4. Panel bed 1 operates as already described. Heated granular medium is sent via pipe 15 to pipe 316 via optional dust-separating means 77, and thence to panel bed 301 treating cold air supplied from line 304 and delivering heated air through line 305. Equipment items 302, 303, 304, 305, 315, 316, 327, 328, 330, 353, 354, 355, 379, and 380 serve the same respective functions, already described in connection with panel bed 1, as equipment items 2, 3, 4, 5, 15, 16, 27, 28, 30, 53, 54, 55, 79, and 80 respectively. Pipe 76 receives cooled medium from pipe 315 and delivers it to hopper 75.

Figure 6:
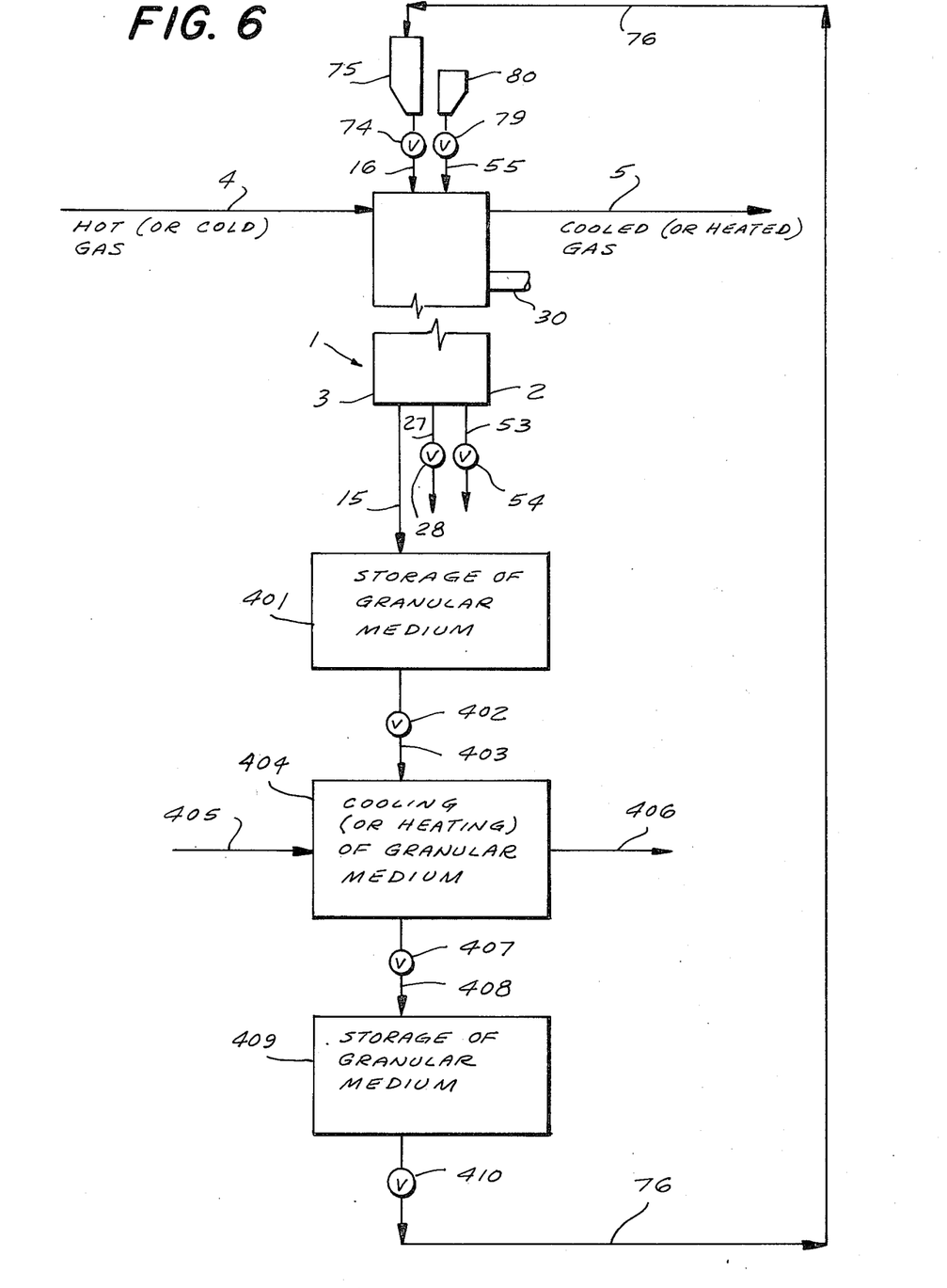
FIG. 6 is a schematic diagram illustrating use of the invention to store heat or cold.

FIG. 6 shows schematically how panel bed 1 can remove heat from a hot gas in line 4 to supply cooled gas in line 5, the heated granular medium spilled from panel bed 1 being sent to storage means 401 for storage until a time at which it is convenient to withdraw the stored hot medium via valve 402 and line 403 and recover the heat stored in the medium in heat recovery means 404, which heats a fluid supplied from line 405 and delivers a heated fluid to line 406. It is convenient to furnish storage means 409 to receive cooled granular medium from line 408 and valve 407 discharging the medium from heat recovery means 404. The medium is withdrawn from storage means 409 via valve 410 and line 76 as required for use in panel bed 1 to cool the hot gas from line 4.

Figure 7:
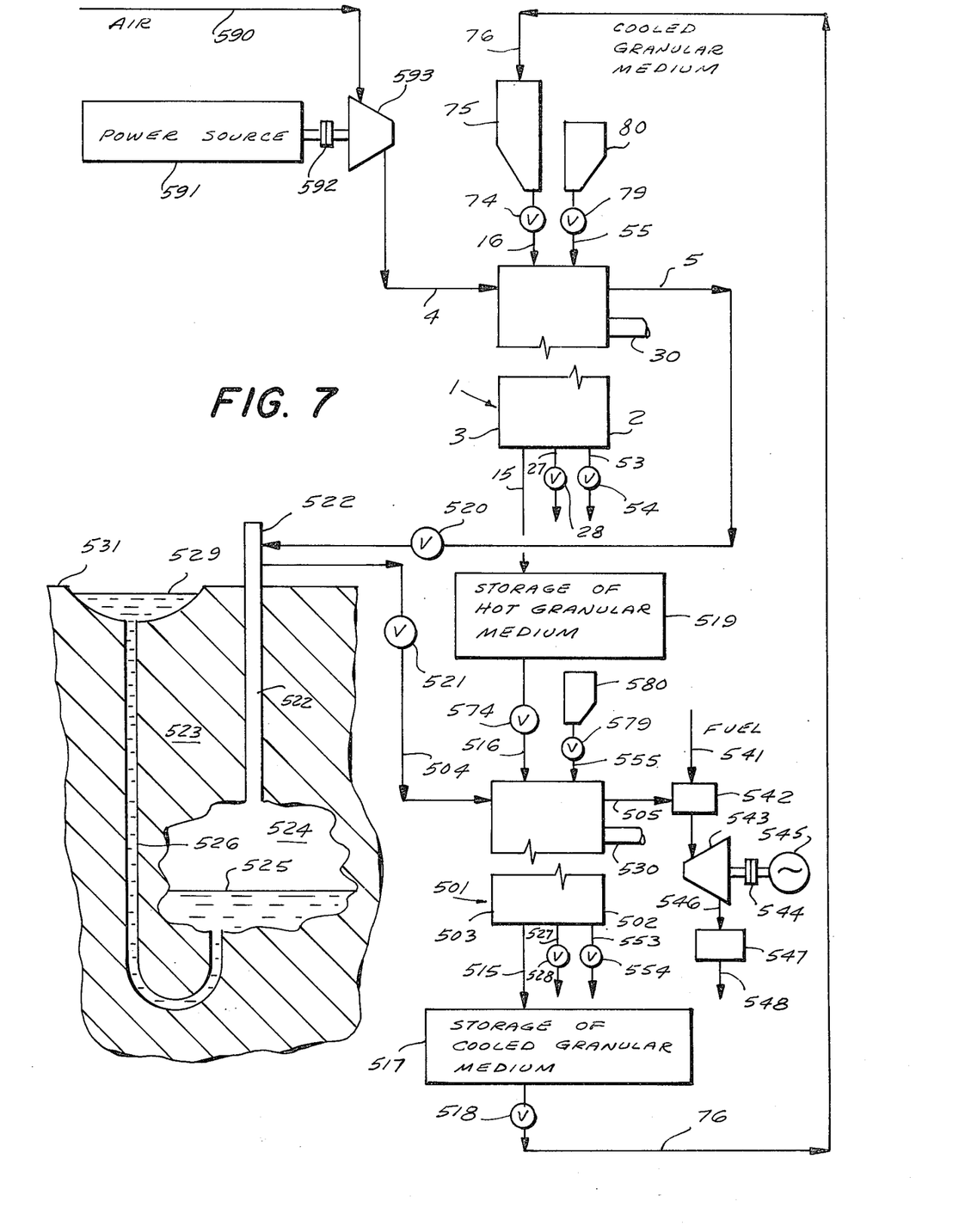
FIG. 7 is a schematic diagram illustrating use of the invention to store heat recovered from compressed air coordinately with a procedure for storing the air and later recovering work by expanding the air.

FIG. 7 shows schematically how the method of the invention can work in cooperation with air storage for generation of peakload electricity. Air from line 590 is compressed in air compressor 593, preferably a large axial-flow machine, driven by power source 591 linked by shaft 592 to compressor 583. The power source is preferably of the large baseload type, such as a large coal-fired or nuclear installation. Air compressor 593 operates preferably in the night to deliver, for example, air at a pressure between about 20 and 50 atmospheres and at a temperature between about 850° and 1200°F to line 4, which carries the air forwardly into panel bed 1, which delivers cooled air via pipe 5, valve 520, and shaft 522 to air storage cavern 524 deep in ground 523. Sometimes cavern 524 advantageously contains a pool of water 525 linked by leg 526 to a reservoir of water 529 in ground surface 531, this arrangement maintaining the pressure of air in cavern 524 substantially constant as it fills with air and the surface of pool 525 sinks. Panel bed 1 receives cooled granular medium from line 76 and delivers heated medium to storage means 519. During the day, valve 520 is closed and air compressor 593 is stopped by uncoupling power source 591, which then generates electricity for the daytime requirement. As this requirement grows too large for power source 591 to meet, valve 521 is opened to withdraw air from cavern 524 via line 504 and panel bed 501, where the air is heated. At the same time, hot granular medium is withdrawn from storage means 519 via valve 274 and line 516 to enter panel bed 501 where the medium is cooled by countercurrent heat exchange with the air from line 504. Equipment items 502, 503, 504, 505, 515, 516, 527, 528, 530, 553, 554, 555, 579, and 580 serve the same respective functions, already described in connection with panel bed 1, as equipment items 2, 3, 4, 5, 15, 16, 27, 28, 30, 53, 54, 55, 79, and 80 respectively. Line 505 carries heated air from panel bed 501 to combustion means 542 where the air serves to burn fuel supplied to means 542 from line 541. Hot combustion products from means 542 are expanded in expansion turbine 546 linked by shaft 544 to electricity generator 545. Exhaust gas from turbine 543 is delivered via line 546 to heat recovery means 547 and exhausted to the atmosphere via line 548. Heat recovery means 547 advantageously is a boiler supplying steam to a steam turbine also fitted to generate electricity. Cooled granular medium withdrawn from panel bed 501 via line 515 is suitably delivered to storage means 517 for retaining the medium until power source 591 is again linked to drive air compressor 593 during the night. At this time, the cold medium is withdrawn from storage means 517 by opening valve 518 and sending the medium via line 76 to hopper 75 from which it can enter panel bed 1 for a second cycle of heating and use to store heat.

As those skilled in the art will appreciate, the arrangement of FIG. 7 could be modified, if desired, so that panel bed 1 serves the indicated function during the night and also serves the function indicated for panel bed 501 during the day; also, so that storage means 519 and storage means 517 are one and the same. The storage means are suitably an underground storage cavern for the hot or cold solid placed at a depth sufficiently great that the overlying rock withstands the pressure of the gas that preferably accompanies the stored solid, for it would not be wise to reduce the pressure of the solid as it enters the storage means. The cavern is preferably tall in comparison to its diameter. As nighttime operation approaches, the cavern would be substantially filled with cold material. As operation of panel bed 1 requires, the cold material would be withdrawn from the bottom of the cavern, preferably by a number of bottom outlets that communicate with a like number of gas lifts to carry the solid to the surface of the ground where it is advantageous to place the panel bed 1. Heated material from panel bed 1 would be returned to the cavern at the top, preferably through a number of top inlets to the cavern space. By suitable choice of the number of top inlets and bottom outlets, the downward motion of the cold granular material in the lower part of the cavern and of the hot granular material in the top part of the cavern will be reasonably uniform across the horizontal cross-section of the cavern, and there will be substantially no mixing of hot and cold granular material. An interface between the hot and the cold material will move down the height of the cavern until it is substantially full of the hot material and ready for daytime operation.

It should be noted that the porosity of granular material bed 18 should be brought initially to the uniform porosity appropriate for the puffback intensity selected for operation, as discussed more fully in the aforementioned application number 1, "Treating Gas and Granular Material in Panel Bed". Specifically, it is advantageous to subject the panel bed initially to a puffback at an intensity exceeding that contemplated for subsequent operation, or to discharge a controlled quantity of granular material from the bottom of panel bed 18.

I do not wish my invention to be limited to the particular embodiments illustrated in the drawings and described above in detail. Other arrangements will be recognized by study of the aforementioned co-pending applications and by those skilled in the art, as well as purposes other than those discussed herein which the invention can advantageously serve.

I claim:
1. A method for solid-gas heat exchange in countercurrent contacting of gas and granular material in a panel bed comprising:
   a. arranging granular material at a given temperature in a bed having a plurality of transversely disposed upwardly spaced gas entry portions separated by interposed supporting members having outer and inner edges with respect to the bed wherein said gas entry portions have gas entry faces with outer edges substantially contiguous with said outer edges of said supporting members and wherein a supporting member is gently curved and inclines downwardly and inwardly from its outer edge and then upwardly and inwardly toward its inner edge and wherein the inner edge of a typical supporting member is above the inner edge of the gas entry face supported by the member, and wherein said bed has gas exit portions spaced from said inner edges of said supporting members;
   b. forwardly flowing gas at a different temperature in a substantially continuing flow during said heat exchange through the gas entry portions of the granular material bed and outwardly from the gas exit portions to exchange heat between said gas and said granular material; and
   c. thereafter causing a transient flow of an auxiliary gas to move in the direction in reverse to the flow of said gas in (b);
   d. said transient reverse flow producing first a rise at a given rate of rise and subsequently a fall in the pressure difference between said gas exit portions and said gas entry portions, said difference produced by said transient reverse flow remaining greater than a first critical minimum difference for a time interval less than about 150 milliseconds, said first critical difference being that difference at which a steady flow of gas in said reverse direction just produces a localized spill of granular material from said gas entry faces, and said difference produced by said transient reverse flow peaking to a top value beyond a second critical minimum difference, which is the pressure difference at which a transient flow of gas in said reverse direction producing said pressure difference at said rate of rise just initiates a body movement of the granular material toward said gas entry faces to spill a portion of the granular material from the bed.

2. A heat-exchange method wherein the method of claim 1 cools a hot granular medium by heat exchange against a cold gas and wherein said cooled granular medium is stored for a time and then heated by heat exchange according to the method of claim 1 by heat exchange with a hotter gas.

3. A heat-exchange method wherein the method of claim 1 heats a cold granular medium by heat exchange against a hot gas and wherein said heated granular medium is stored for a time and then cooled by heat exchange according to the method of claim 1 by heat exchange with a colder gas.

4. A heat-exchange method wherein the method of claim 1 cools air at high pressure before said air is stored in an underground cavern by heat exchange of said air at high pressure with a granular material and wherein said heated granular material is stored while said air is kept in said underground cavern and wherein said air upon withdrawal from said underground cavern is subsequently heated by heat exchange according to the method of claim 1 by heat exchange with said stored granular material.

5. A heat-exchange method wherein the method of claim 1 cools effluent from a gas-fluidized bed of particulate matter, with removal of dust therein by heat exchange of said effluent with a granular material thereby heating said material and wherein said heated granular material is subsequently cooled by heat exchange according to the method of claim 1 by heat exchange with at least a part of the gas used to fluidize said bed.

6. A heat-exchange method wherein the method of claim 1 cools a feed gas to a cryogenic process by heat exchange of said gas with a granular material thereby heating said material and wherein said heated granular material is subsequently cooled by heat exchange according to the method of claim 1 by heat exchange with at least a part of the cold gaseous products of the cryogenic process.

7. A heat-exchange method wherein the method of claim 1 heats air by heat exchange of said air with a granular material thereby cooling said material and wherein said cooled granular material is subsequently heated by heat exchange according to the method of claim 1 with hot combustion products from the combustion of a fuel with air.

8. A heat-exchange method wherein the method of claim 1 heats air for the combustion of a fuel having a higher heating value below about 5,000 Btu per pound by heat exchange of said air with a granular material thereby cooling said material and wherein said cooled granular material is subsequently heated by heat exchange according to the method of claim 1 with hot combustion products from the combustion of said fuel with said air.

9. The heat-exchange method of claim 8 wherein said combustion of said fuel with said air is conducted in a fluidized bed.

10. The heat-exchange method of claim 9 wherein said hot combustion products from said combustion of said fuel with said air contains particulate matter and wherein said spill from said gas entry faces includes accumulated particulate matter removed from said hot combustion products.

11. A method for solid-gas heat exchange in countercurrent contacting of gas and granular material in a panel bed comprising:
   a. arranging granular material at a given temperature in a bed having a plurality of transversely disposed upwardly spaced gas entry portions separated by interposed supporting members having outer and inner edges with respect to the bed wherein said gas entry portions have gas entry faces with outer edges substantially contiguous with said outer edges of said supporting members and wherein a supporting member is gently curved and inclines downwardly and inwardly from its outer edge and then upwardly and inwardly toward its inner edge and wherein the inner edge of a typical supporting member is below the inner edge of the gas entry face supported by the member so that a line drawn through these edges is inclined at an angle of less than about 45° to the horizontal and wherein said bed has gas exit portions spaced from said inner edges of said supporting members;
   b. forwardly flowing gas at a different temperature in a substantially continuing flow during said heat exchange through the gas entry portions of the granular material bed and outwardly from the gas exit portions to exchange heat between said gas and said granular material; and
   c. thereafter causing a transient flow of an auxiliary gas to move in the direction in reverse to the flow of said gas in (b);
   d. said transient reverse flow producing first a rise at a given rate of rise and subsequently a fall in the pressure difference between said gas exit portions and said gas entry portions, said difference produced by said transient reverse flow remaining greater than a first critical minimum difference for a time interval less than about 150 milliseconds, said first critical difference being that difference at which a steady flow of gas in said reverse direction just produces a localized spill of granular material from said gas entry faces, and said difference produced by said transient reverse flow peaking to a top value beyond a second critical minimum difference, which is the pressure difference at which a transient flow of gas in said reverse direction producing said pressure difference at said rate of rise just initiates a body movement of the granular material toward said gas entry faces to spill a portion of the granular material from the bed.

12. A heat-exchange method wherein the method of claim 11 heats air by heat exchange of said air with a granular material thereby cooling said material and wherein said cooled granular material is subsequently heated by heat exchange according to the method of claim 11 with hot combustion products from the combustion of a fuel with air.

13. A heat-exchange method wherein the method of claim 11 heats air for the combustion of a fuel having a higher heating value below about 5,000 Btu per pound by heat exchange of said air with a granular material thereby cooling said material and wherein said cooled granular material is subsequently heated by heat exchange according to the method of claim 11 with hot combustion products from the combustion of said fuel with said air.

14. A heat-exchange method wherein the method of claim 11 cools effluent from a gas-fluidized bed of particulate matter, with removal of dust therein, by heat exchange of said effluent with a granular material thereby heating said material and wherein said heated granular material is subsequently cooled by heat exchange according to the method of claim 11 by heat exchange with at least a part of the gas used to fluidize said bed.

15. A heat-exchange method wherein the method of claim 11 cools a feed gas to a cryogenic process by heat exchange of said gas with a granular material thereby heating said material and wherein said heated granular material is subsequently cooled by heat exchange according to the method of claim 11 by heat exchange with at least a part of the cold gaseous products of the cryogenic process.

* * * * *